US010725837B1

(12) United States Patent
Dash et al.

(10) Patent No.: US 10,725,837 B1
(45) Date of Patent: Jul. 28, 2020

(54) PERSISTENT SCRATCHPAD MEMORY FOR DATA EXCHANGE BETWEEN PROGRAMS

(71) Applicant: NVIDIA Corporation, Santa Clara, CA (US)

(72) Inventors: Rajballav Dash, San Jose, CA (US); Jack H. Choquette, Palo Alto, CA (US); Ming Liang Milton Lei, Santa Clara, CA (US); Stephen Jones, San Francisco, CA (US); Christopher Frederick Lamb, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/677,503

(22) Filed: Nov. 7, 2019

(51) Int. Cl.
*G06F 3/00* (2006.01)
*G06F 9/54* (2006.01)
*G06F 9/52* (2006.01)
*G06F 9/50* (2006.01)
*G06F 9/48* (2006.01)

(52) U.S. Cl.
CPC ............ *G06F 9/544* (2013.01); *G06F 9/4843* (2013.01); *G06F 9/5027* (2013.01); *G06F 9/52* (2013.01)

(58) Field of Classification Search
CPC .................................. G06F 9/54; G06F 9/52
USPC .......................................... 719/310; 711/152
See application file for complete search history.

(56) References Cited

U.S. PATENT DOCUMENTS 10,649,914 B1 * 5/2020 Caccamo ................. G06F 13/30
2018/0101483 A1 * 4/2018 Catthoor ............... G06F 12/122

OTHER PUBLICATIONS

Mariamma Chacko, An Error-Localization, Validation and Optimization Tool for Embedded Code Augmentation: an Architecture Oriented Approach. (Year: 2011).*

* cited by examiner

*Primary Examiner* — Lechi Truong
(74) *Attorney, Agent, or Firm* — Leydig, Voit & Mayer, Ltd.

(57) ABSTRACT

Techniques are disclosed for sharing of data exchange among kernels (each a set of instructions) executing on a system having multiple processing units. In an embodiment, each processing unit includes an on-chip scratchpad memory that can be accessed by the kernels executing on the processing unit. All or a portion of the scratchpad memory can be allocated and configured, for example, such that the scratchpad is accessible to multiple kernels in parallel, to one or more kernels in serial, or a combination of both.

18 Claims, 10 Drawing Sheets

PERSISTENT SCRATCHPAD MEMORY FOR DATA EXCHANGE BETWEEN PROGRAMS

TECHNICAL FIELD

The present disclosure relates to sharing memory between programs, and more particularly to persistent scratchpad memory for data exchange between programs.

BACKGROUND

Conventionally, an amount of on-chip scratchpad memory (e.g., 16 KB, 32 KB, or 64 KB in size) is allocated from a pool of scratchpad memory and assigned to a set of one or more execution contexts ("SEC") (e.g., where an execution context is a thread or a process) that execute a kernel serially and/or in parallel, where a kernel is a set of instructions such as a program. In one example, a set of one or more execution contexts is a Cooperative Thread Array (CTA). The scratchpad memory allocated to a SEC is private to the SEC and the data stored in the scratchpad memory is not persistent once the SEC finishes execution of the kernel. Also, there is no automatic backing memory for the scratchpad memory. Therefore, in a conventional system, the data stored in scratchpad memory is exchanged between different kernels by having each SEC executing one kernel explicitly copy the data from its allocated scratchpad to global memory and each SEC executing another kernel explicitly retrieving the data from global memory.

To reach the global memory (e.g., DRAM or cache), a memory hierarchy of caches (e.g., L1, L2, etc.) is typically traversed, so that the data is transferred through one or more levels of caching. Compared with the latency of accessing the scratchpad memory, exchanging data through global memory may be at least an order of magnitude slower. Furthermore, because the scratchpad memory is private to each SEC, different SECs executing the same kernel must also exchange data through the global memory. Hence, a need exists to allow SECs and/or kernels to exchange data more quickly than through conventional approaches.

SUMMARY

Fast on-chip memory (e.g., scratchpad) may be shared between different kernels executed on the same processing unit by one or more threads or processes, where each processing unit has its own pool of private scratchpad memory. In the context of the following description, a thread (e.g., a thread of execution) is an instantiation of a set of instructions to be executed. A kernel may be executed by one or more SECs. The fast on-chip memory may also be shared between different SECs executing the same kernel on the same processing unit. Sharing the scratchpad memory reduces latency for transferring data between kernels or between different SECs compared with transferring the data through a memory hierarchy that may include one or more levels of caching to the global memory. Sharing the scratchpad memory also reduces latency for synchronization operations between different SECs and different kernels compared with synchronization through the memory hierarchy.

A method and system are disclosed for a plurality of processing units that includes a first processing unit including a first scratchpad and a first register file, where the first processing unit is capable of executing a first kernel and a second kernel. The plurality of processing units also includes a second processing unit including a second scratchpad and a second register file, where the second processing unit is capable of executing a third kernel. Scheduler logic coupled to the plurality of processing units, where the scheduler circuitry assigns kernels to be executed by the plurality of processing units and a memory is coupled to the plurality of processing units. The parallel processing system is configured such that storing of first data to either the first scratchpad or the second scratchpad does not cause the first data to be stored in the memory, where the first scratchpad is configured to allow such first kernel to store second data to the first scratchpad, to allow such second kernel to load the second data from the first scratchpad, and to disallow such third kernel to store or load the second data from the first scratchpad. The second scratchpad is configured to allow such third kernel to store third data to the second scratchpad and to disallow such first and second kernels to load the third data from the second scratchpad.

DETAILED DESCRIPTION

Figure 1A:
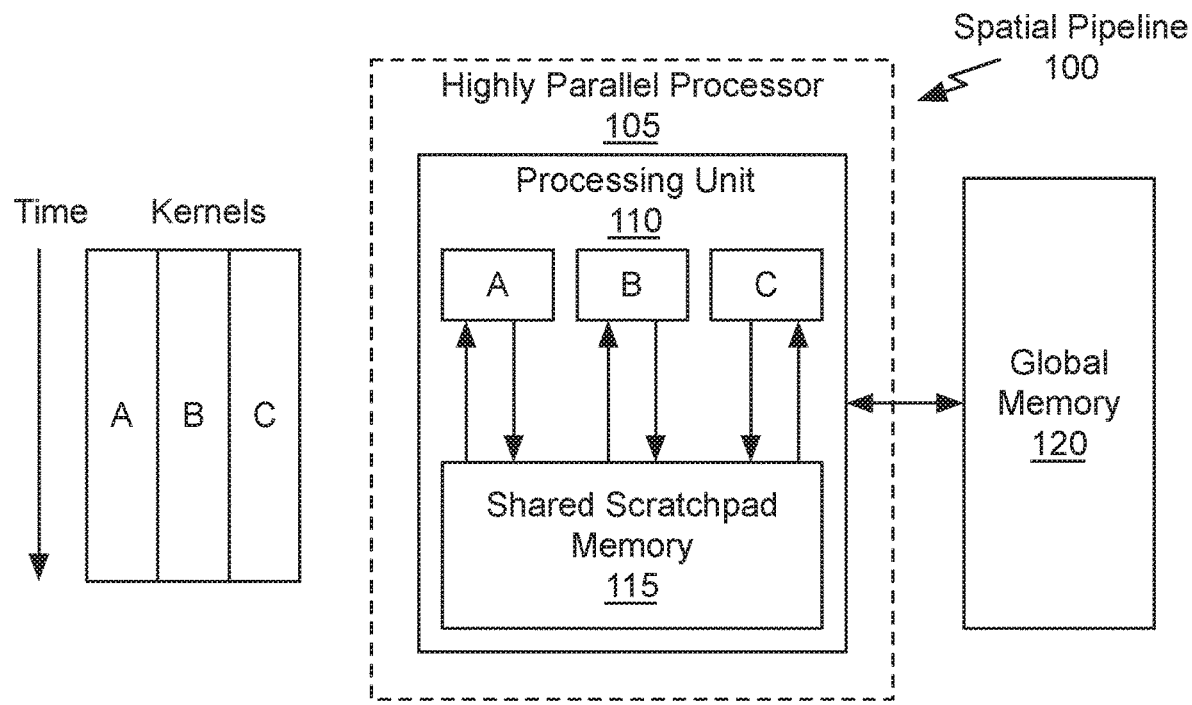
FIG. 1A is a conceptual diagram illustrating a spatial pipeline for execution of kernels A, B, and C, in accordance with an embodiment.

A highly parallel processor, such as a graphics processing unit (GPU) is a compute device capable of executing a very large number of threads in parallel. In the context of the following description, a thread is a process or an execution context. In an embodiment, a highly parallel processor operates as a coprocessor to the main central processing unit (CPU), or host: In other words, data-parallel, compute-intensive portions of applications running on the host are off-loaded onto the coprocessor device.

More precisely, a portion of an application that is executed many times, but independently on different data, can be isolated into a kernel function that is executed on the highly parallel processor as many different threads. To that effect, such a function is compiled to a parallel thread execution (PTX) instruction set and the resulting kernel is translated at install time to the target highly parallel processor instruction set.

The batch of threads that executes a kernel is organized as a grid of SECs (e.g., CTAs). In an embodiment, SECs implement CUDA® (Compute Unified Device Architecture) thread blocks, where CUDA® is a parallel computing platform and programming model. The PTX programming model is explicitly parallel: a PTX program specifies the execution of a given thread of a parallel thread array.

Threads within an SEC execute the same kernel concurrently and can communicate with each other. To coordinate the communication of the threads within the SEC, synchronization points are specified where threads wait until all threads in the SEC have arrived at a particular instruction. Each thread has a unique thread identifier within the SEC. Programs use a data parallel decomposition to partition inputs, work, and results across the threads of the SEC.

Each SEC thread uses its thread identifier to determine its assigned role, assign specific input and output positions, compute addresses, and select work to perform. In an embodiment, the thread identifier is a three-element vector tid, (with elements tid.x, tid.y, and tid.z) that specifies the thread's position within a one, two, or three-dimensional SEC. In an embodiment, each thread identifier component ranges from zero up to the number of thread ids in the corresponding SEC dimension. In an embodiment, each SEC has a one, two, or three-dimensional shape specified by a three-element vector ntid (with elements ntid.x, ntid.y, and ntid.z). In an embodiment, the vector ntid specifies the number of threads in each SEC dimension.

Threads within a SEC execute in SIMT (single-instruction, multiple-thread) fashion in groups called warps. A warp is a maximal subset of threads from a single SEC, such that the threads execute the same instructions at the same time. Threads within a warp are sequentially numbered. The warp size is a machine-dependent constant. In an embodiment, a warp has 32 threads. Some applications may be able to maximize performance with knowledge of the warp size, so PTX includes a run-time immediate constant, WARP SZ, which may be used in any instruction where an immediate operand is allowed.

There is a maximum number of threads that an SEC can contain, as constrained by the processor logic. However, SECs that execute the same kernel can be batched together into a grid of SECs that execute independently, so that the total number of threads that can be launched in a single kernel invocation is very large. However, in a conventional highly parallel processor, organizing SECs into a grid comes at the expense of reduced thread communication and synchronization, because threads in different SECs cannot communicate and synchronize with each other. Multiple SECs may execute concurrently and in parallel, or sequentially (consecutively), depending on the platform.

Each SEC has a unique SEC identifier (ctaid) within a grid of SECs. Each grid of SECs has a one, two, or three-dimensional shape specified by the parameter nctaid. Each grid also has a unique temporal grid identifier (gridid). In an embodiment, threads may read and use the identifier and parameter values through predefined, read-only special registers % tid, % ntid, % ctaid, % nctaid, and % gridid.

The host issues a succession of kernel invocations to the highly parallel processing device. Each kernel is executed as a batch of threads organized as a grid of SECs. A pipeline-based programming model enables control of concurrency and dependencies between different kernels during execution by the highly parallel processor. In an embodiment, the highly parallel processor includes a plurality of processing units, where each processing unit has a dedicated private pool of scratchpad memory. The pipeline-based programming model allows different kernels being executed by a single processing unit, either serially or in parallel, to share scratchpad memory which has been allocated from the single processing unit's private pool of scratchpad memory.

FIG. 1A is a conceptual diagram illustrating a spatial pipeline 100 for execution of kernels A, B, and C, in accordance with an embodiment. A highly parallel processor 105 includes a plurality of processing units 110, only one of which is shown in FIG. 1A. The highly parallel processor 105 is coupled to a global memory 120 through a memory hierarchy that includes one or more memory address mapping, translation, and/or cache units (not shown). In contrast with loading and storing data from and to the global memory 120 through the memory hierarchy, transferring data to and/or from a shared scratchpad memory 115 within the processing unit 110 is fast, providing low latency data transfer without copying or moving the data between different levels of the memory hierarchy. The single shared scratchpad memory 115 is allocated from the private pool of scratchpad memory within the processing unit 110.

The pipeline-based programming model specifies that the kernels A, B, and C are to be executed concurrently, exchanging data through the single shared scratchpad memory 115 as the kernels A, B, and C are executed. Each of the kernels is assigned to by one or more SECs based on the processing resources required by the kernel. For example, the kernel A produces and stores data to the shared scratchpad memory 115 that is loaded from the shared scratchpad memory 115 and consumed by the kernel B and/or the kernel C. In an embodiment, execution of the kernel B and/or the kernel C is synchronized with the kernel A before the kernel B and/or the kernel C loads the data that was produced and stored by the kernel A.

The kernel B may process the data produced by kernel A, loaded from the shared scratchpad memory 115, and store the processed data back into the shared scratchpad memory 115. The processed data can then be loaded from the shared scratchpad memory 115 by the kernel C and/or the kernel A for further processing. Finally, further processed data stored to the shared scratchpad memory 115 by the kernel C may be loaded from the shared scratchpad memory 115 by the kernel A and/or the kernel B. An example application that may specify a spatial pipeline 100 include highly parallel packet processing for networking. When execution of the kernels A, B, and C is complete, the shared scratchpad memory 115 may be deallocated and the one or more SECs may be reassigned.

In addition to enabling low-latency exchange of data between different kernels, the shared scratchpad memory 115 also enables the low-latency exchange of data between different SECs assigned to the same kernel for the SECs executed within each processing unit 110. An example application that may have improved performance by the low latency data exchange between SECs within the same processing unit 110 includes pooling operations for neural networks and/or reduction operations.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
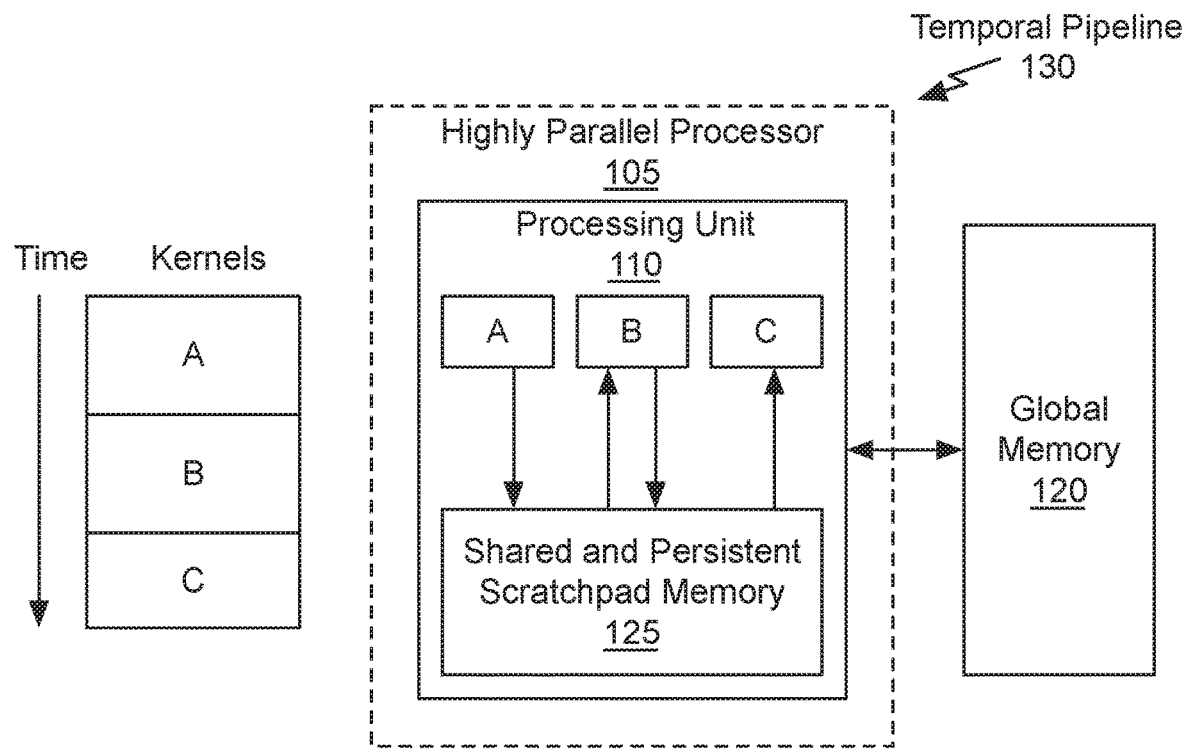
FIG. 1B, is a conceptual diagram illustrating a temporal pipeline for execution of kernels A, B, and C, in accordance with an embodiment.

FIG. 1B, is a conceptual diagram illustrating a temporal pipeline 130 for execution of kernels A, B, and C, in accordance with an embodiment. Compared with FIG. 1A, the shared scratchpad memory 115 within the processing unit 110 is replaced with shared and persistent scratchpad memory 125. Like the shared scratchpad memory 115, the shared and persistent scratchpad memory 125 also provides low latency data transfer between kernels and/or between SECs without copying or moving the data between different levels of the memory hierarchy. The single shared and persistent scratchpad memory 125 is allocated from the private pool of scratchpad memory within the processing unit 110.

The pipeline-based programming model specifies that the kernels A, B, and C are to be executed serially, exchanging data through the single shared and persistent scratchpad memory 125 as the kernels A, B, and C are executed. Each of the kernels is assigned to one or more SECs based on the processing resources required by the kernel. For example, the kernel A produces and stores data to the shared and persistent scratchpad memory 125. The data is then loaded from the shared and persistent scratchpad memory 125 and consumed by the kernel B. The data stored to the shared and persistent scratchpad memory 125 by the kernel A is retained even after execution of kernel A is complete because the kernels B and C have not completed execution. Therefore, the shared memory is not only shared, but is also persistent. When execution of the kernel A is complete the one or more SECs assigned to kernel A may be reassigned.

Any SEC executing on the processing unit 110 may access the shared and persistent scratchpad memory 125. However, in an embodiment, an SEC executing on a second processing unit 110 within the highly parallel processor 105 cannot access the shared and persistent scratchpad memory 125 within the processing unit 110.

After execution of the kernel A is completed, the kernel B processes the data produced by kernel A and stores the processed data to the shared and persistent scratchpad memory 125. The data stored to the shared and persistent scratchpad memory 125 by the kernel B is retained even after execution of kernel B is complete because the kernel C has not completed execution. However, when execution of the kernel B is complete the one or more SECs assigned to kernel B may be reassigned.

The processed data stored by the kernel B can be loaded from the shared and persistent scratchpad memory 125 by the kernel C for further processing. When execution of the kernel C is complete, the shared and persistent scratchpad memory 125 may be deallocated and the one or more SECs assigned to the kernel C may be reassigned. An example application that may specify a temporal pipeline 130 include deep learning inferencing that includes multiple highly-parallel operations performed in sequence.

Figure 2:
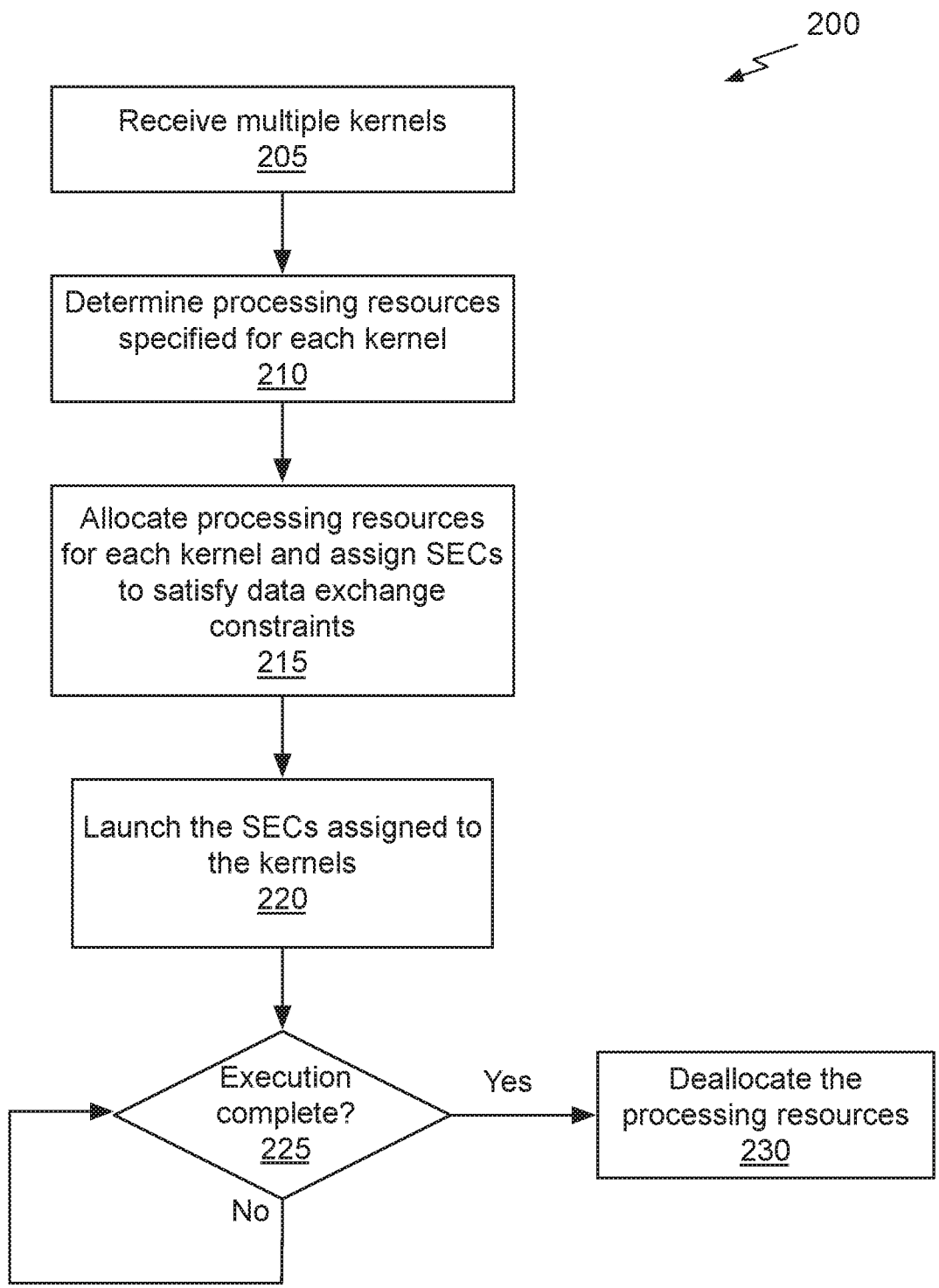
FIG. 2 illustrates a flowchart of a method for multiple kernels to exchange data through a shared and persistent memory, in accordance with an embodiment.

FIG. 2 illustrates a flowchart of a method 200 for multiple kernels to exchange data through a shared and persistent memory, in accordance with an embodiment. In an embodiment, the method 200 may be used to exchange data through the shared scratchpad memory 115 and the shared and persistent scratchpad memory 125, as shown in FIGS. 1A and 1B, respectively.

At step 205, the processing unit 110 receives multiple kernels for execution according to a spatial pipeline, such as the spatial pipeline 100. In an embodiment, the spatial pipeline 100 may be expressed using a graph-based definition to indicate concurrent execution constraints and dependencies. Such a graph-based definition may be converted into one or more kernels including spatial and/or temporal pipelines.

At step 210, the processing unit determines processing resources specified for each kernel. The processing resources may include one or more functions or operations, registers, per-thread private memory, and an amount of shared memory. In a conventional processing unit, the processing resources for any kernels assigned to the same SEC are equal. In contrast, the processing unit 110 may be configured to allocate different amounts of processing resources to different kernels assigned to the same SEC.

At step 215, the processing resources are allocated for each kernel and SECs are assigned to satisfy data exchange constraints defined by the spatial and/or temporal pipelines. In an embodiment, the processing unit 110 obtains a size of the shared memory resource that is specified for each kernel. In an embodiment, a size of the shared scratchpad memory 115 that is allocated to one or more kernels equals a largest shared memory resource specified for the one or more kernels. In an embodiment, a size of the shared scratchpad memory 115 that is allocated to one or more kernels equals a sum of the shared memory resources specified for the one or more kernels. At step 220, the SECs assigned to the kernels are launched.

When at step 225, the processing unit 110 determines that execution of the kernels is complete, then at step 230 the processing resources are deallocated and the SECs may be assigned to other kernels. In an embodiment, the shared scratchpad memory 115 allocated to the one or more kernels is deallocated when execution of all of the kernels sharing the scratchpad memory 115 is complete.

The number of SECs that a processing unit 110 can process concurrently depends on the number of registers needed per thread and the size of shared scratchpad memory per SEC required for a given kernel since the processing resources within the processing unit 110 (e.g., registers and private pool of scratchpad memory) are split among all the threads that are assigned to the kernel. If there are not enough registers and/or shared memory available per processing unit 110 to process at least one SEC, the kernel will fail to launch. In an embodiment, the scratchpad memory may be allocated in a variety of sizes (e.g., 16 KB, 32 KB, 64 KB, etc.).

Although method 200 is described in the context of a processor, the method 200 may also be performed by a program, custom logic or circuitry, or by a combination of custom circuitry and a program. For example, the method 200 may be executed by a GPU or CPU, or any logic device or processor capable of providing a shared scratchpad memory. Furthermore, persons of ordinary skill in the art will understand that any system that performs method 200 is within the scope and spirit of embodiments of the present disclosure.

In addition to the shared scratchpad memory 115 and/or the shared and persistent scratchpad memory 125, each thread also has a private local memory. Conventionally, the threads included in a single SEC share a portion of memory allocated from the private pool of scratchpad memory within the processing unit 110. Conventionally, the portion of memory allocated from the private pool of scratchpad memory is deallocated when the SEC completes execution. Importantly, the portion of memory is not visible to threads in other SECs and because the portion of memory is not persistent it cannot be shared between different SECs executing in sequence. Therefore, in the conventional memory hierarchy, threads in different SECs exchange data using the high latency path through global memory 120 provided by store and load operations.

In an embodiment, additional memory spaces are accessible by all threads: constant, texture, and surface memory spaces. Constant memory and texture memory are read-only; however, surface memory is readable and writable. The global memory 120, constant memory, texture memory, and surface memory spaces are optimized for different memory usages. For example, texture memory offers different addressing modes as well as data filtering for specific data formats. Note that texture memory and surface memory are cached, and within the same kernel call, the cache is not kept coherent with respect to global memory writes and surface memory writes, so any texture fetch or surface read to an address that has been written to via a global write or a surface write in the same kernel call returns undefined data. In other words, a thread can safely read some texture memory or surface memory location only if the memory location has been updated by a previous kernel call or memory copy, but not if it has been previously updated by the same thread or another thread from the same kernel call.

The shared scratchpad memory 115 and shared and persistent scratchpad memory 125 are not cached. Data stored in the shared scratchpad memory 115 and shared and persistent scratchpad memory 125 is not moved or copied to a backing store. From a thread's point-of-view, accessing the shared scratchpad memory 115 and shared and persistent scratchpad memory 125 is similar to accessing the global memory 120, but is much faster.

In an embodiment, the architecture of the highly parallel processor 105 is built around a scalable array of processing units 110, where each processing unit 110 is a multithreaded Streaming Multiprocessor (SM). When a host program invokes a kernel grid, the SECs of the grid are enumerated and distributed to processing units 110 with available execution capacity. The threads of an SEC execute concurrently on one processing unit 110. As SECs terminate, new blocks are launched on the vacated processing units 110.

A processing unit 110 includes multiple Scalar Processor (SP) cores, a multithreaded instruction unit, and on-chip private pool of scratchpad memory. The processing unit 110 creates, manages, and executes concurrent threads in hardware with zero scheduling overhead. It implements a single-instruction barrier synchronization. Fast barrier synchronization together with lightweight thread creation and zero-overhead thread scheduling efficiently support very fine-grained parallelism, allowing, for example, a low granularity decomposition of problems by assigning one thread to each data element (such as a pixel in an image, a voxel in a volume, a cell in a grid-based computation).

To manage hundreds of threads running several different programs, the processing unit 110 employs an architecture referred to as SIMT (single-instruction, multiple-thread). The processing unit 110 maps each thread to one scalar processor core, and each scalar thread executes independently with its own instruction address and register state. The multiprocessor scheduler unit creates, manages, schedules, and executes threads in groups of parallel threads called warps. (This term originates from weaving, the first parallel thread technology.) Individual threads composing a SIMT warp start together at the same program address but are otherwise free to branch and execute independently.

When a particular processing unit 110 is given one or more thread blocks to execute, the processing unit 110 splits the thread blocks into warps that get scheduled by the scheduler unit. The way a block is split into warps is always the same; each warp contains threads of consecutive, increasing thread IDs with the first warp containing thread 0.

At every instruction issue time, the scheduler unit selects a warp that is ready to execute and issues the next instruction to the active threads of the warp. A warp executes one common instruction at a time, so full efficiency is realized when all threads of a warp agree on their execution path. If threads of a warp diverge via a data-dependent conditional branch, the warp serially executes each branch path taken, disabling threads that are not on that path, and when all paths complete, the threads converge back to the same execution path. Branch divergence occurs only within a warp; different warps execute independently regardless of whether the warps are executing common or disjointed code paths.

SIMT architecture is akin to SIMD (Single Instruction, Multiple Data) vector organizations in that a single instruction controls multiple processing elements. A key difference is that SIMD vector organizations expose the SIMD width to the software, whereas SIMT instructions specify the execution and branching behavior of a single thread. In contrast with SIMD vector machines, SIMT enables programmers to write thread-level parallel code for independent, scalar threads, as well as data-parallel code for coordinated threads. For the purposes of correctness, the programmer can essentially ignore the SIMT behavior; however, substantial performance improvements can be realized by taking care that the code seldom requires threads in a warp to diverge. In practice, this is analogous to the role of cache lines in traditional code: Cache line size can be safely ignored when designing for correctness but must be considered in the code structure when designing for peak performance. Vector architectures, on the other hand, require the software to coalesce loads into vectors and manage divergence manually. An embodiment of the SIMT architecture is described in further detail below.

Parallel Processing Architecture

Figure 3:
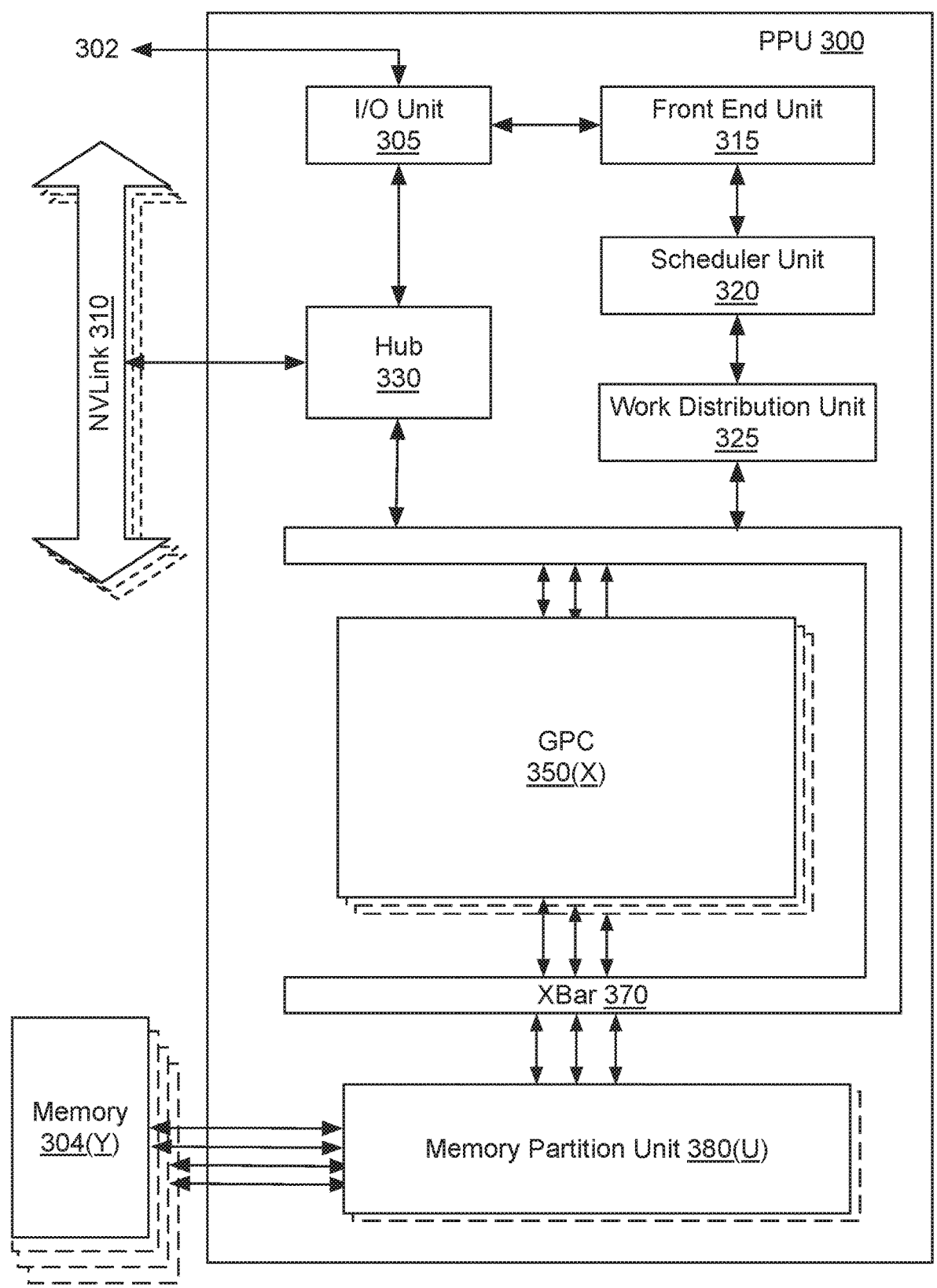
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. In an embodiment, the highly parallel processor 105 is a PPU 300. The PPU 300 is a latency hiding architecture designed to process many threads in parallel. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory 304 is the global memory 120. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program or kernel executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via Xbar 370. The Xbar 370 is an interconnect network that couples many of the units of the PPU 300 to other units of the PPU 300. For example, the Xbar 370 may be configured to couple the work distribution unit 325 to a particular GPC 350. Although not shown explicitly, one or more other units of the PPU 300 may also be connected to the Xbar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the Xbar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel.

Figure 4A:
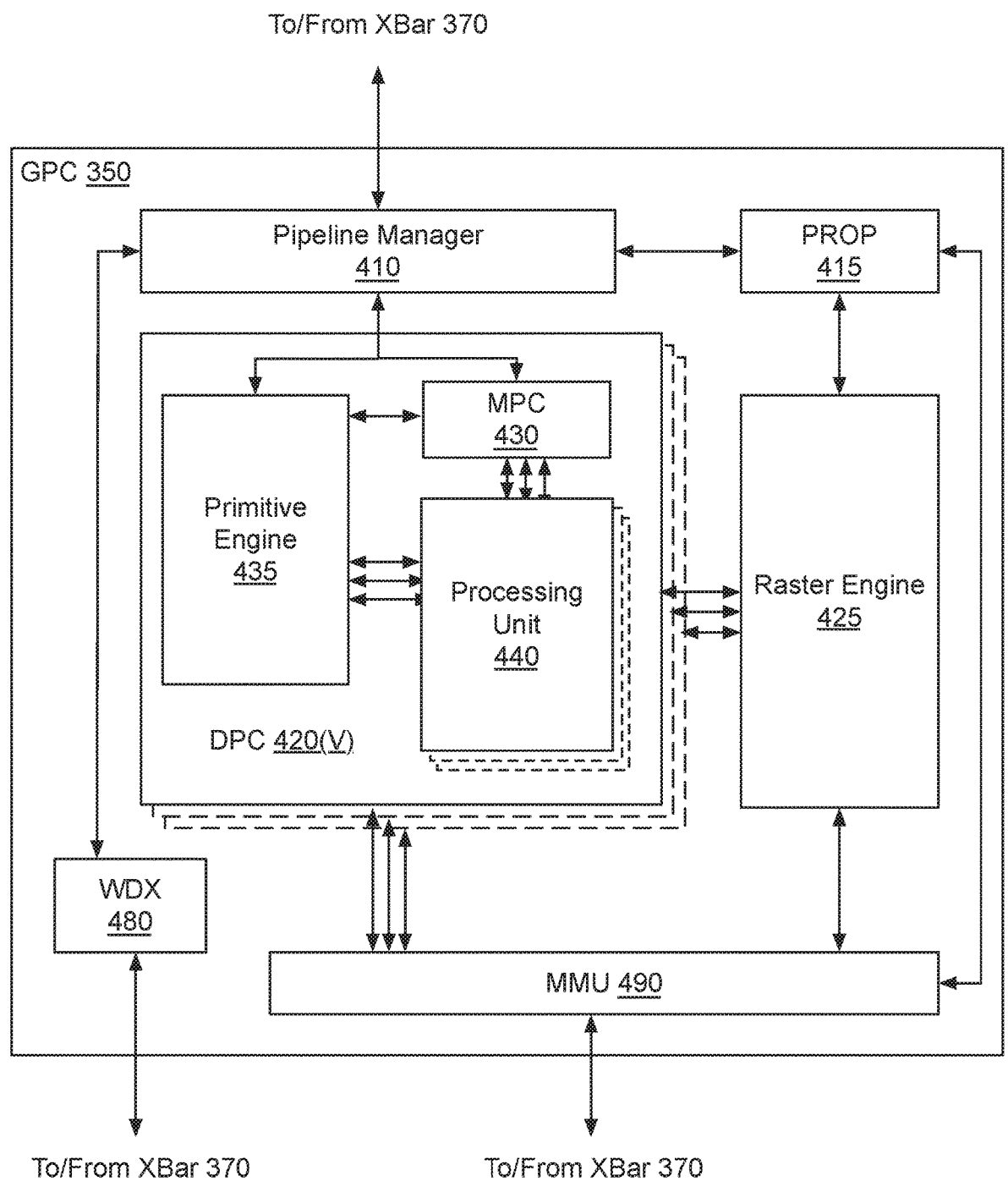
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
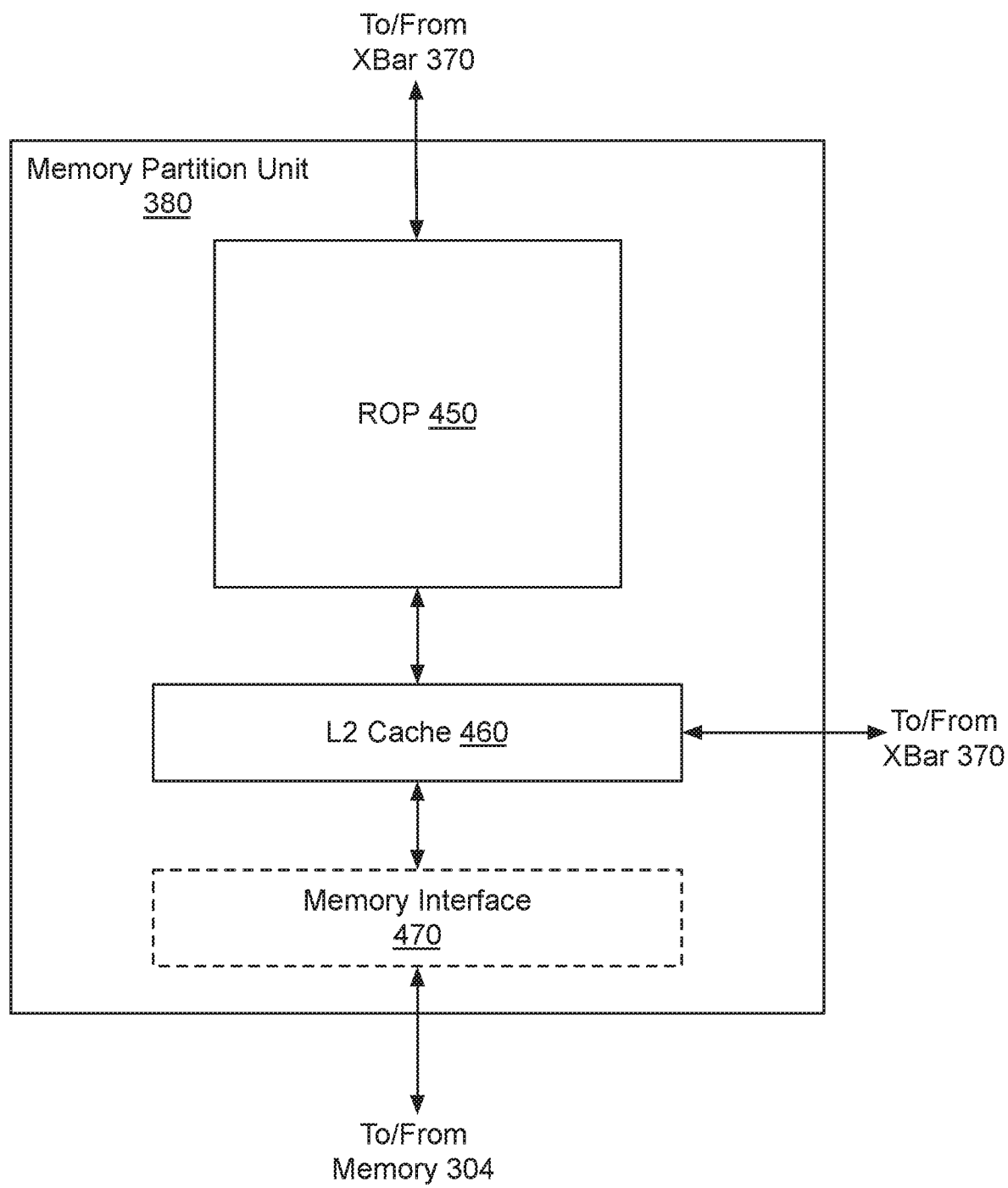
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. In an embodiment, the processing unit 110 is an SM 440. Each SM 440 is multi-threaded and configured to execute a plurality of threads (e.g., 32 threads) from a particular group of threads concurrently. In an embodiment, the SM 440 implements a SIMD architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state are maintained for each warp, enabling concurrency between warps and serial execution within warps when threads within the warp diverge. In another embodiment, a program counter, call stack, and execution state are maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBMx memory interface and Y equals half U. In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. The L1 cache within a particular SM 440 can be accessed by any of the SECs executing on the SM 440. Data from the L2 cache 460 may be fetched and stored in each of the L1 caches for processing in the functional units of the SMs 440. The L2 cache 460 is coupled to the memory interface 470 and the Xbar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
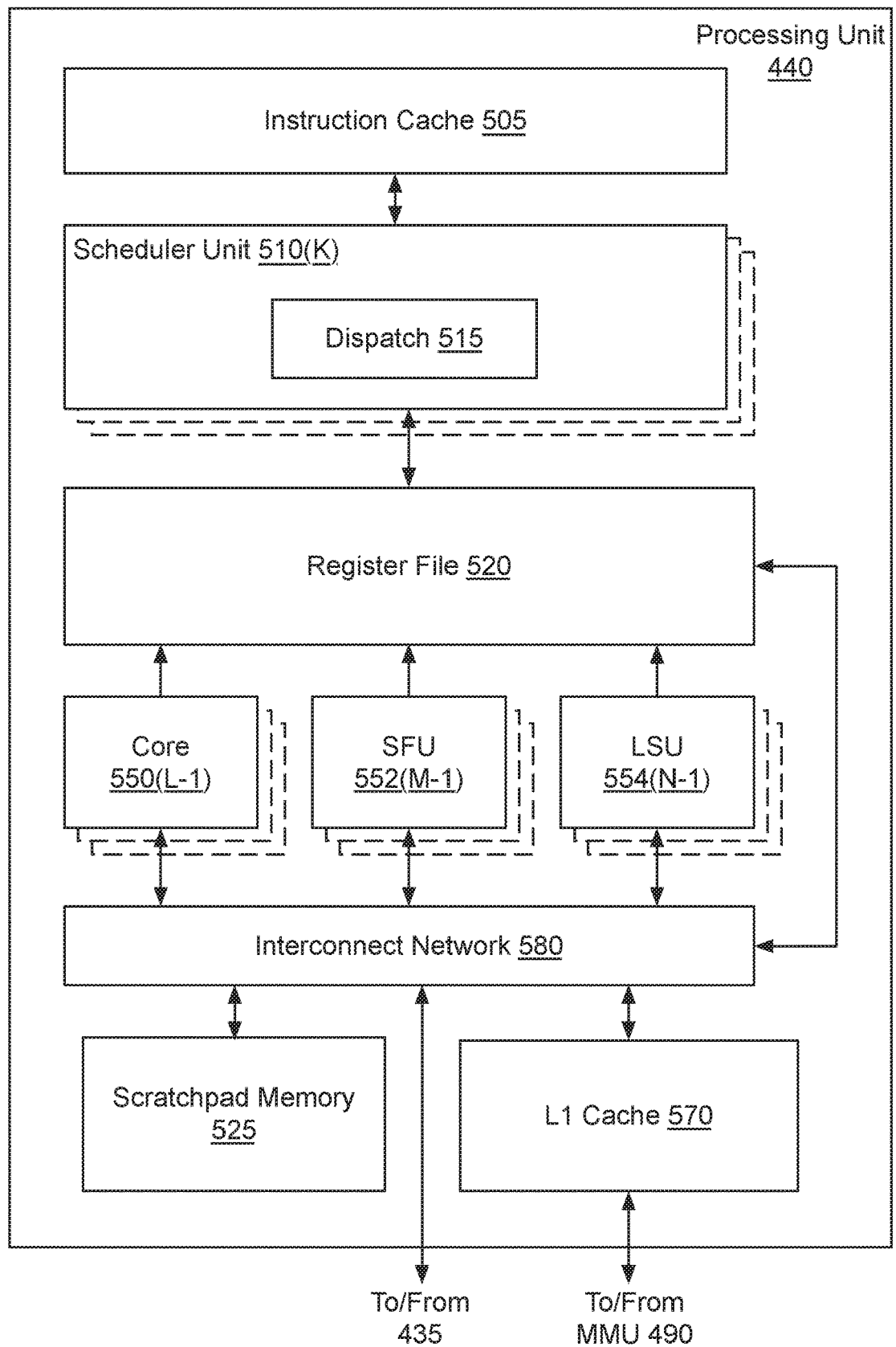
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a pool of scratchpad memory 525, and an L1 cache 570. The shared scratchpad memory 115 and/or the shared and persistent scratchpad memory 125 are allocated from the scratchpad memory 525.

As described above, the work distribution unit 325 dispatches tasks for execution on the GPCs 350 of the PPU 300. The tasks are allocated to a particular DPC 420 within a GPC 350 and, if the task is associated with a shader program or kernel, the task may be allocated to an SM 440. The scheduler unit 510 receives the tasks from the work distribution unit 325 and manages instruction scheduling for one or more thread blocks assigned to the SM 440. The scheduler unit 510 schedules thread blocks included in an SEC for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different SECs to the various functional units (e.g., cores 550, SFUs 552, and LSUs 554) during each clock cycle.

SECs provide a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

SECs enable programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. SEC primitives enable new patterns of cooperative parallelism, including producer-consumer parallelism, opportunistic parallelism, and global synchronization across an entire grid of SECs.

When kernels are annotated to indicate concurrency between different kernels or dependencies between different kernels, the SECs assigned to execute the kernels are allocated the shared scratchpad memory 115 or the shared and persistent scratchpad memory 125, accordingly. Similarly, when a single kernel annotated to indicate concurrency and/or dependencies is assigned to multiple SECs, the multiple SECs assigned to execute the kernel are allocated the shared scratchpad memory 115 or the shared and persistent scratchpad memory 125, accordingly.

When two kernels that exchange data are assigned multiple SECs in two or more processing units 110, the SECs in a first processing unit 110 cannot exchange data with the SECs in a second processing unit 110 through the shared scratchpad memory within either the first or second processing unit 110. Therefore, the kernels may be assigned to SECs in a sliced manner, so that threads assigned to different kernels that exchange data are executed within the same processing unit 110. For example, assuming four SECs execute within each processing unit 110, a first pair of the SECs executed in the first processing unit 110 are assigned to a first kernel and the remaining second pair of SECs executed in the first processing unit 110 are assigned to a second kernel. The first pair of SECs executing the first kernel are able to exchange data with the second pair of SECs executing the second kernel.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include a texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations to/from each of the scratchpad memory 525 and the L1 cache 570 and the register file 520. Each SM 440 includes an interconnect network 580 that connects each of the functional units to the register file 520 and the LSU 554 to the register file 520, scratchpad memory 525 and the L1 cache 570. In an embodiment, the interconnect network 580 is a crossbar that can be configured to connect any of the functional units to any of the registers in the register file 520 and connect the LSUs 554 to the register file and memory locations in the scratchpad memory 525 and/or the L1 cache 570.

The L1 cache 570 is a separate array of on-chip memory that allows for data storage and communication between the SM 440 and the primitive engine 435. In an embodiment, the L1 cache 570 comprises 128 KB of storage capacity and is in the path from the SM 440 to the memory partition unit 380. The L1 cache 570 can be used to cache reads and writes. One or more of the L1 cache 570, L2 cache 460, and memory 304 are backing stores within the multi-level memory hierarchy.

In an embodiment, a single array of on-chip memory is configured to provide separate allocations to implement the scratchpad memory 525 and the L1 cache 570. Combining data cache and scratchpad memory functionality into a single memory block provides the best overall performance for both types of memory accesses. The capacity is usable as a cache by kernels that do not use shared memory. For example, if shared memory is configured to use half of the capacity, texture and load/store operations can use the remaining capacity. Combining the scratchpad memory 525 and the L1 cache 570 enables the scratchpad memory 525 to function as a high-throughput conduit for exchanging data while the L1 cache 570 simultaneously provides high-bandwidth and low-latency access to frequently reused data stored in the memory 304.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, the scratchpad memory 525 to communicate between threads, and the LSU 554 to read and write global memory through the L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Shared and Persistent Scratchpad Memory

Figure 5B:
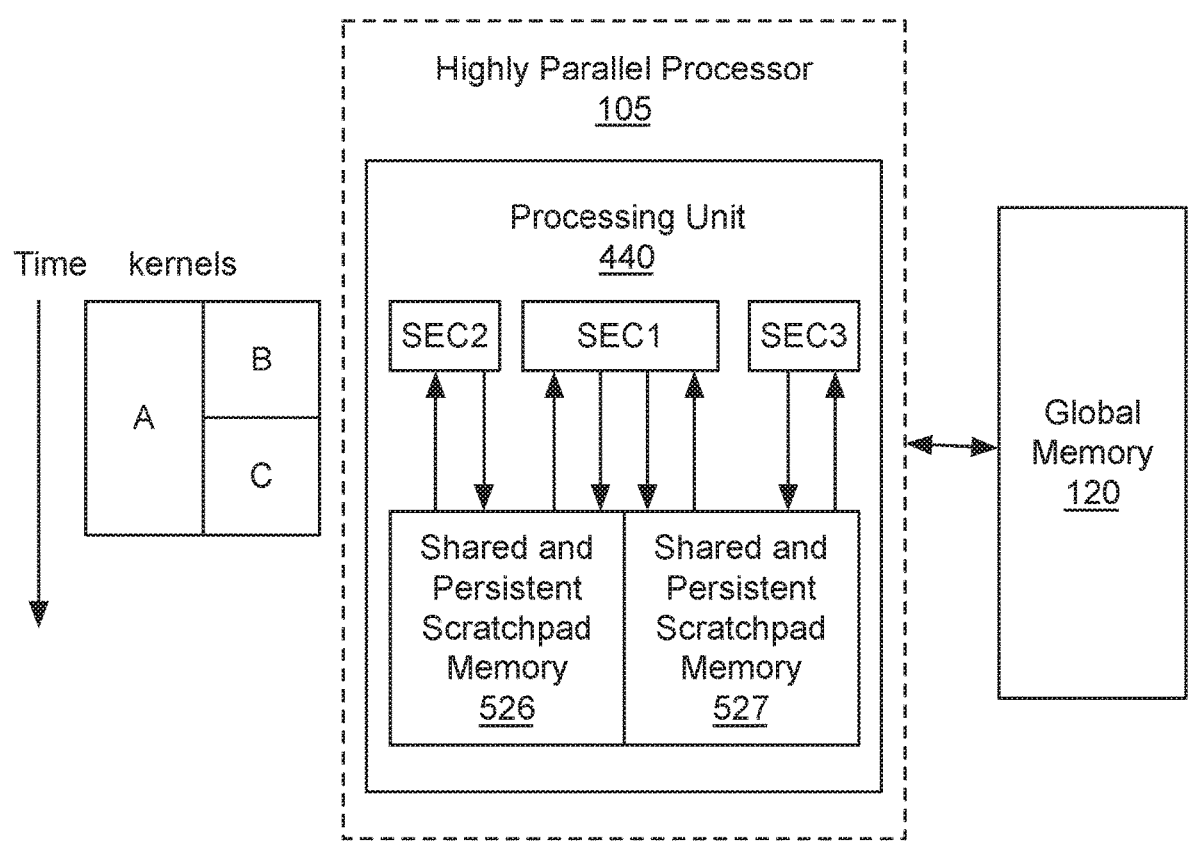
FIG. 5B, is a conceptual diagram illustrating a processing pipeline for execution of kernels A, B, and C, in accordance with an embodiment.

FIG. 5B, is a conceptual diagram illustrating a processing pipeline for execution of kernels A, B, and C, in accordance with an embodiment. The kernel A is annotated to indicate that kernel A should be executed concurrently with kernels B and C. Kernels B and C are annotated to indicate that kernel C should be executed after kernel B and that kernel C will consume data produced, by kernel A, where the data produced by kernel A is, at least in part, produced based on data received from kernel B. Therefore, kernels A, B, and C are assigned to SECs within the same processing unit 440 and the shared and persistent scratchpad memories 526 and 527 are allocated for executing the SECs.

Specifically, SEC1 is assigned to kernel A, SEC2 is assigned to kernel B, and SEC3 is assigned to kernel C. The shared and persistent scratchpad memory 526 is allocated for and shared by the SEC1 and SEC2. The shared and persistent scratchpad memory 527 is allocated for and shared by the SEC1 and SEC3. Data stored to the shared and persistent scratchpad memory 526 by the SEC2 is persistent, even after SEC2 completes execution of the kernel B. Therefore, the SEC1 may load and produce data based on the data produced by SEC2 concurrently with execution of SEC3. Importantly, SEC3 cannot access the shared and persistent scratchpad memory 526 and overwrite the data stored by the SEC2. Furthermore, the amount of memory from the private pool of scratchpad memory within the processing unit 110 that is allocated to provide the shared and persistent scratchpad memories 526 and 527 is not necessarily equal. Note that an SEC, such as the SEC1 may access multiple shared and persistent scratchpad memories.

Like the shared scratchpad memory 115, the shared and persistent scratchpad memory 125 also provides low latency data transfer between kernels and/or between SECs executing on the processing unit 440 without copying or moving the data between different levels of the memory hierarchy. Additionally, multiple kernels, each having different processing resource requirements can be allocated one or more shared and persistent scratchpad memories for the transfer of data between each other and/or within a kernel assigned to two or more SECs.

Once the kernel A and kernel B are launched, they are able to exchange data freely until execution of both kernels completes. Because the data stored to the shared and persistent scratchpad memory 526 by the kernel B is retained even after execution of kernel B is complete, kernel launch overheads may be reduced. In a temporal pipeline (for example, where C follows B as shown in FIG. 5B) when one kernel produces data as a result of its execution the data may be passed to a successor kernel via the memory system. To transfer the data, the producer (B) performs a "write" operation. The "write" operation is followed by a "read" operation during startup of the consumer (C). In a conventional system, the write-then-read will experience the latencies of the entire memory system hierarchy rather than the fast latency of the persistent scratchpad memory 526. However, when the persistent scratchpad memory 526 is available, the producer can leave the data in the persistent scratchpad memory 526 and the consumer will simply find the data in the persistent scratchpad memory 526 upon startup. The persistent feature of the persistent scratchpad memory 526 can reduce both the shutdown overhead of B, plus the startup overhead of C.

Figure 5C:
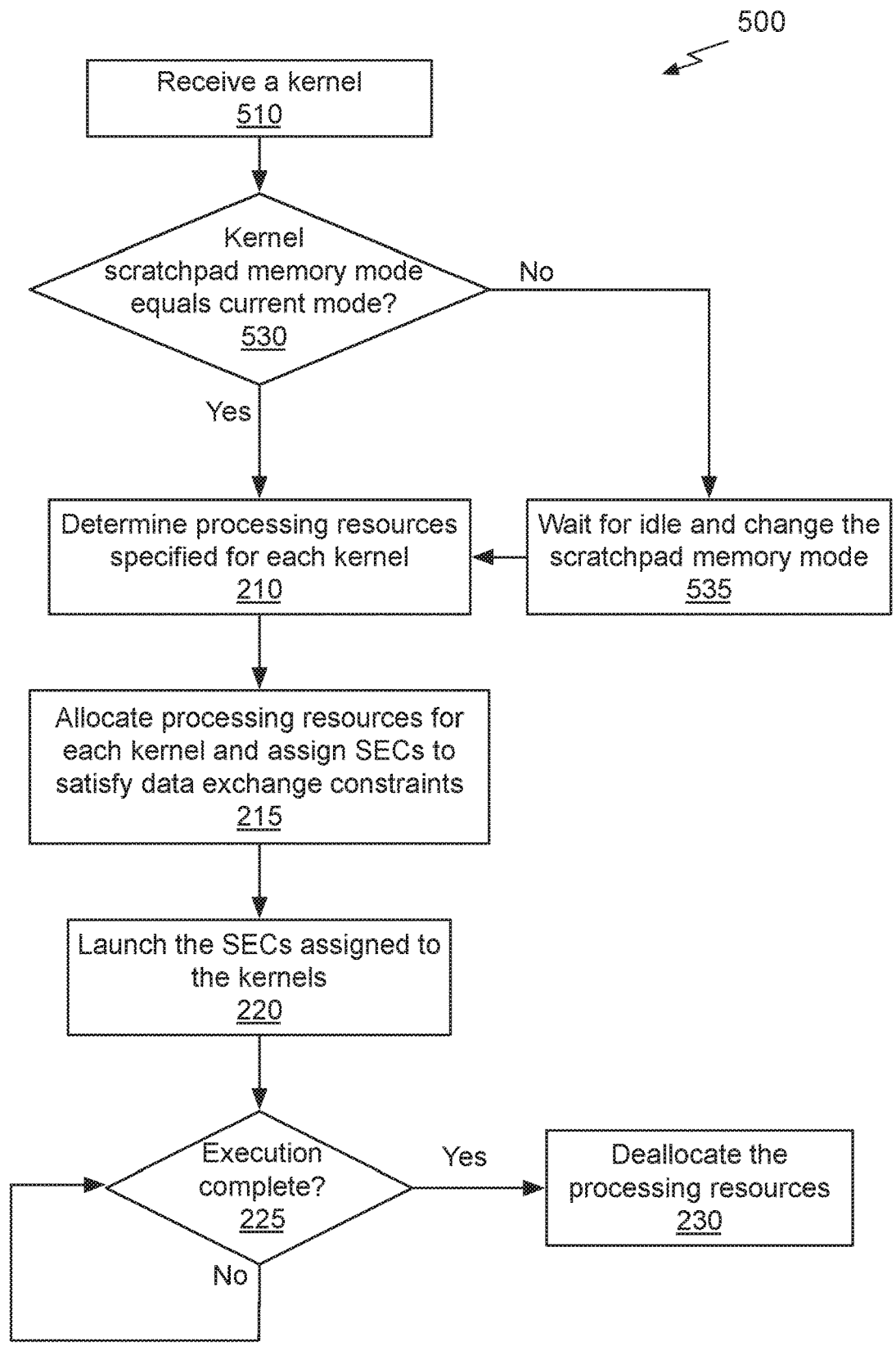
FIG. 5C illustrates a flowchart of a method for configuring the pool of shared scratchpad memory in a processing unit to enable SECs to exchange data through a shared and persistent memory, in accordance with an embodiment.

FIG. 5C illustrates a flowchart of a method 500 for configuring the pool of shared memory in a processing unit 440 to enable SECs to exchange data through a shared and persistent scratchpad memory, in accordance with an embodiment. In an embodiment, the method 500 may be used to exchange data through the shared and persistent scratchpad memory 125, 526, and/or 527.

At step 510, the processing unit 440 receives a kernel for execution. The processing unit 110 may be configured to operate in one of two scratchpad memory modes. When operating in a private scratchpad memory mode, separate portions of the scratchpad memory 525 are allocated for access only by each individual SEC assigned to execute a kernel within the processing unit 440. In other words, the private scratchpad memory mode is compatible with the conventional operation of the per-SEC scratchpad memory. When operating in a shared scratchpad mode, a portion of the scratchpad memory 525 is allocated for access by one or more SECs that are assigned to the same kernel and executing in the processing unit 440 and/or SECs that are assigned to different kernels and executing in the processing unit 440.

At step 530, the scheduler unit 510 determines if annotations associated with the kernel indicate that the kernel operates in a shared scratchpad memory mode or a private scratchpad memory mode. If the mode specified by the kernel equals the current operating mode of the scratchpad memory 525 within the processing unit 440, then the scheduler unit 510 proceeds to step 210. Otherwise, the operating mode of the scratchpad memory 525 cannot satisfy the data exchange constraints specified for the kernel and, at step 535, the scheduler unit 530 waits for the processing unit 440 to become idle and then changes the scratchpad memory mode. Steps 210, 215, 220, 225, and 230 are completed as previously described in conjunction with FIG. 2.

In an embodiment, different kernels executing within the processing unit 440 may use different operating modes for different portions of the scratchpad memory 525 so that the operating mode is defined for each allocated portion of the scratchpad memory 525 and tracked by the scheduler unit 530. When per-allocated portion operating modes supported by the scheduler unit 530, steps 530 and 535 are omitted.

When the scratchpad memory 525 is configured in the shared mode, a portion of the scratchpad memory 525 that was previously available for a single SEC executing a single kernel on a single processing unit 440 can now be shared among multiple SECs executing the same or different kernels, where the SECs execute the kernels either in parallel or serially. The latency of data exchange through the scratchpad memory 525 is reduced compared with exchanging data through the memory 304. Synchronization of threads can be performed across the multiple SECs that share the same portion of the scratchpad memory 525, reducing synchronization latency. In an embodiment, synchronization logic is provided to transmit synchronization signals within the processing unit 440 while data is exchanged through the scratchpad memory 525. In an embodiment, synchronization logic is provided to transmit synchronization signals between processing units 440 while data is exchanged through the global memory 120.

Furthermore, when the scratchpad memory 525 is configured in the shared mode, data stored in the scratchpad memory 525 that was previously available only during execution of a single kernel can persist between executions of the same or different kernels executing serially within the same processing unit 440. Therefore, kernel launch overheads are reduced because data can be exchanged between different kernels executing serially or within a single kernel executed by multiple SECs.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 6A:
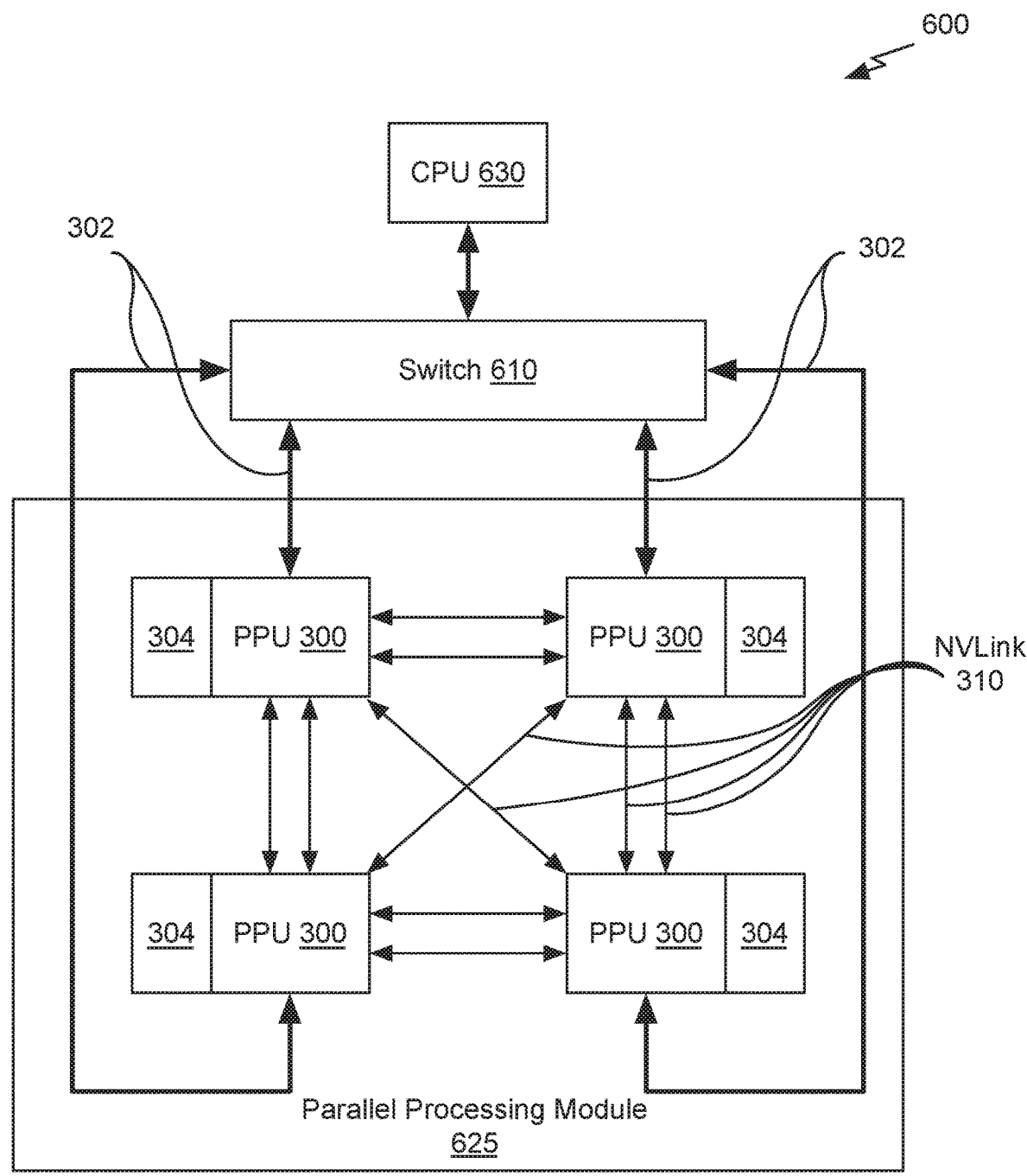
FIG. 6A is a conceptual diagram of a processing system implemented using the PPU of FIG. 3, in accordance with an embodiment.

FIG. 6A is a conceptual diagram of a processing system 600 implemented using the PPU 300 of FIG. 3, in accordance with an embodiment. The exemplary processing system 600 may be configured to implement the method 200 shown in FIG. 2 and/or the method 500 shown in FIG. 5C. The processing system 600 includes a CPU 630, switch 610, and multiple PPUs 300, and respective memories 304. The NVLink 310 provides high-speed communication links between each of the PPUs 300. Although a particular number of NVLink 310 and interconnect 302 connections are illustrated in FIG. 6A, the number of connections to each PPU 300 and the CPU 630 may vary. The switch 610 interfaces between the interconnect 302 and the CPU 630. The PPUs 300, memories 304, and NVLinks 310 may be situated on a single semiconductor platform to form a parallel processing module 625. In an embodiment, the switch 610 supports two or more protocols to interface between various different connections and/or links.

In another embodiment (not shown), the NVLink 310 provides one or more high-speed communication links between each of the PPUs 300 and the CPU 630 and the switch 610 interfaces between the interconnect 302 and each of the PPUs 300. The PPUs 300, memories 304, and interconnect 302 may be situated on a single semiconductor platform to form a parallel processing module 625. In yet another embodiment (not shown), the interconnect 302 provides one or more communication links between each of the PPUs 300 and the CPU 630 and the switch 610 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 630 through the switch 610. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 625 may be implemented as a circuit board substrate and each of the PPUs 300 and/or memories 304 may be packaged devices. In an embodiment, the CPU 630, switch 610, and the parallel processing module 625 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 630 also includes one or more NVLink 310 interfaces.

In an embodiment, the NVLink 310 allows direct load/store/atomic access from the CPU 630 to each PPU's 300 memory 304. In an embodiment, the NVLink 310 supports coherency operations, allowing data read from the memories 304 to be stored in the cache hierarchy of the CPU 630, reducing cache access latency for the CPU 630. In an embodiment, the NVLink 310 includes support for Address Translation Services (ATS), allowing the PPU 300 to directly access page tables within the CPU 630. One or more of the NVLinks 310 may also be configured to operate in a low-power mode.

Figure 6B:
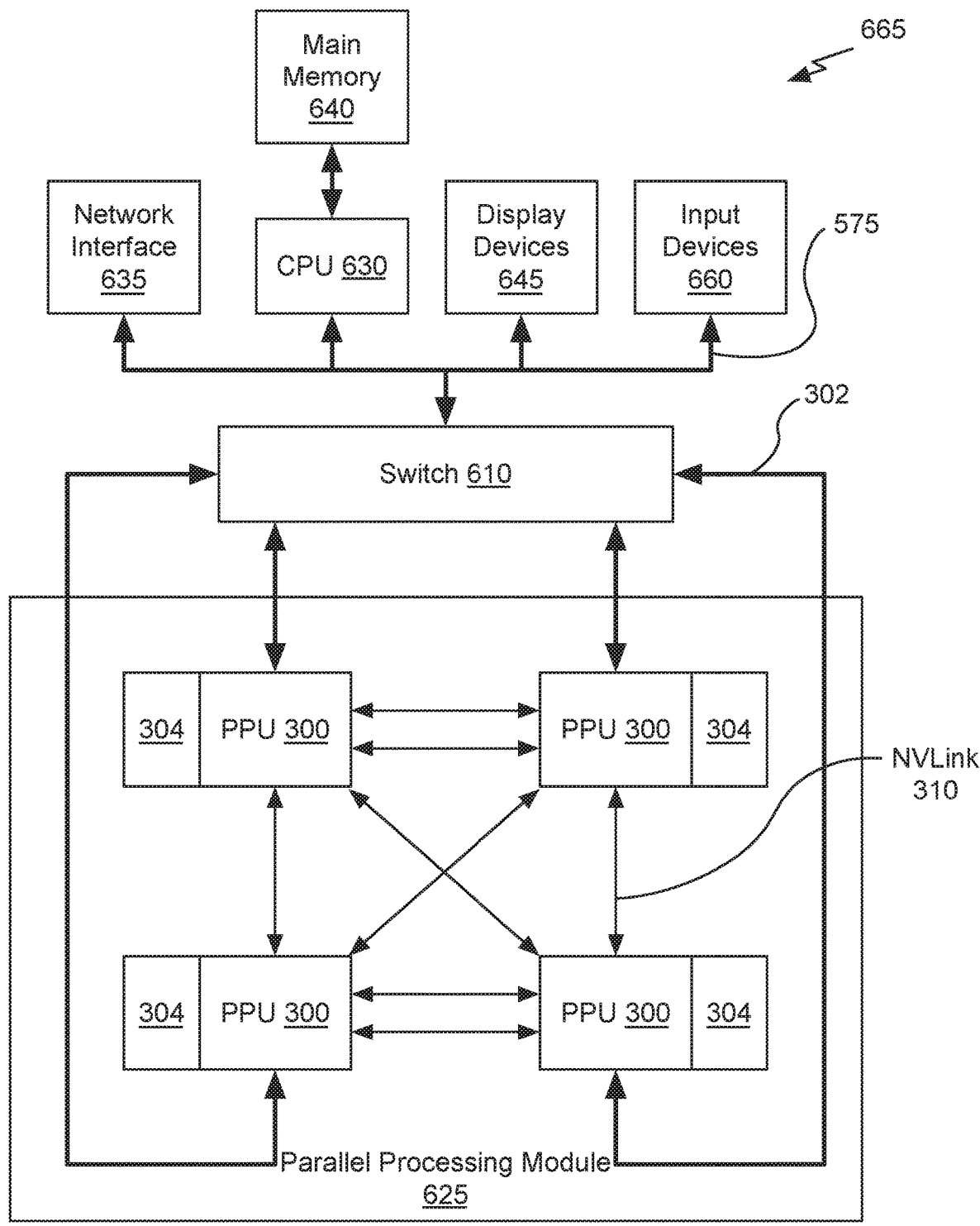
FIG. 6B illustrates an exemplary system in which the various architecture and/or functionality of the various previous embodiments may be implemented.

FIG. 6B illustrates an exemplary system 665 in which the various architecture and/or functionality of the various previous embodiments may be implemented. The exemplary system 665 may be configured to implement the method 200 shown in FIG. 2 and/or the method 500 shown in FIG. 5C.

As shown, a system 665 is provided including at least one central processing unit 630 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 665 also includes a main memory 640. Control logic (software) and data are stored in the main memory 640 which may take the form of random access memory (RAM).

The system 665 also includes input devices 660, the parallel processing system 625, and display devices 645, e.g. a conventional CRT (cathode ray tube), LCD (liquid crystal display), LED (light emitting diode), plasma display or the like. User input may be received from the input devices 660, e.g., keyboard, mouse, touchpad, microphone, and the like. Each of the foregoing modules and/or devices may even be situated on a single semiconductor platform to form the system 665. Alternately, the various modules may also be situated separately or in various combinations of semiconductor platforms per the desires of the user.

Further, the system 665 may be coupled to a network (e.g., a telecommunications network, local area network (LAN), wireless network, wide area network (WAN) such as the Internet, peer-to-peer network, cable network, or the like) through a network interface 635 for communication purposes.

The system 665 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 640 and/or the secondary storage. Such computer programs, when executed, enable the system 665 to perform various functions. The memory 640, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 665 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch)

the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The invention claimed is:

1. A parallel processing system, comprising:
a plurality of processing units including:
a first processing unit including a first scratchpad and a first register file, wherein the first processing unit is capable of executing a first kernel and a second kernel, and
a second processing unit including a second scratchpad and a second register file, wherein the second processing unit is capable of executing a third kernel;
scheduler logic coupled to the plurality of processing units, wherein the scheduler circuitry assigns kernels to particular processing units in the plurality of processing units to be executed; and
a memory coupled to the plurality of processing units,
wherein the parallel processing system is configured such that storing of first data to either the first scratchpad or the second scratchpad does not cause the first data to be stored in the memory;
wherein the first scratchpad is configured to allow such first kernel to store second data to the first scratchpad, to allow such second kernel to load the second data from the first scratchpad, and to disallow such third kernel to store or load the second data from the first scratchpad,
wherein the second scratchpad is configured to allow such third kernel to store third data to the second scratchpad and to disallow such first and second kernels to load the third data from the second, and
wherein the parallel processing system allocates the first scratchpad from a pool of scratchpad memory included within the first processing unit and deallocates the first scratchpad after execution of such first and second kernels, thereby returning the first scratchpad to the pool of scratchpad memory.

2. The parallel processing system of claim 1, wherein the first kernel is associated with one or more threads.

3. The parallel processing system of claim 1, wherein such first and second kernels execute concurrently for at least one period of time on the first processing unit.

4. The parallel processing system of claim 3, wherein, during the first period of time, execution of the first kernel and the second kernel are synchronized through the first scratchpad.

5. The parallel processing system of claim 1, wherein such first and second kernels execute consecutively on the first processing unit.

6. The parallel processing system of claim 1, wherein the first processing unit includes a third scratchpad configured to be accessible by such first kernel and a fourth kernel executing on the first processing unit, wherein the third scratchpad is configured to allow such first kernel to store fifth data to the third scratchpad, to allow such fourth kernel to load the fifth data from the third scratchpad, and to disallow such second and third kernels to store or load the fifth data from the third scratchpad.

7. The parallel processing system of claim 1, wherein the parallel processing system obtains a size for the first scratchpad and causes the first scratchpad to have sufficient storage locations for the obtained size.

8. The parallel processing system of claim 7, where in the size is 4 KB, 8 KB, 16 KB, 32 KB, 64 KB, or 128 KB.

9. The parallel processing system of claim 1, wherein the first processing unit is configured to execute in a first mode and a second mode, wherein during the first mode, only a single kernel can access the first scratchpad, and wherein during the second mode, multiple kernels executing in parallel or in serial can access the first scratchpad.

10. The parallel processing system of claim 9, wherein the parallel processing system causes the single kernel to complete executing in the first mode prior to operating in the second mode.

11. The parallel processing system of claim 9, wherein the first mode is a private mode and the second mode is a shared mode.

12. The parallel processing system of claim 1, further comprising a third processing unit including a third scratchpad and a third register file, wherein the third processing unit is capable of executing the first kernel and the second kernel, and the scheduler logic:

assigns a first set of one or more execution contexts to execute the first kernel on the third processing unit; and assigns a second set of one or more execution contexts to execute the second kernel on the third processing unit, wherein the first set of one or more execution contexts exchange data with the second set of one or more execution contexts through the third scratchpad and complete execution without accessing the first scratchpad.

13. The parallel processing system of claim 1, wherein, prior to loading the second data, execution of the first kernel and the second kernel are synchronized through the first scratchpad.

14. A computer-implemented method, comprising:

assigning a first kernel and a second kernel for execution by a first processing unit of a plurality of processing units coupled to a memory, the first processing unit including a first scratchpad and a first register file, wherein the first processing unit is capable of executing the first kernel and the second kernel;

assigning a third kernel for execution by a second processing unit of the plurality of processing units, the second processing unit including a second scratchpad and a second register file, wherein the second processing unit is capable of executing the third kernel, wherein storing of first data to either the first scratchpad or the second scratchpad does not cause the first data to be stored in the memory;

configuring the first scratchpad to allow such first kernel to store second data to the first scratchpad, to allow such second kernel to load the second data from the first scratchpad, and to disallow such third kernel to store or load the second data from the first scratchpad, wherein the first scratchpad is allocated from a pool of scratchpad memory included within the first processing unit and the first scratchpad is deallocated after execution of such first and second kernels, thereby returning the first scratchpad to the pool of scratchpad memory; and configuring the second scratchpad to allow such third kernel to store third data to the second scratchpad and to disallow such first and second kernels to load the third data from the second scratchpad.

15. The computer-implemented method of claim 14, wherein such first and second kernels execute concurrently for at least one period of time on the first processing unit.

16. The computer-implemented method of claim 14, wherein such first and second kernels execute consecutively on the first processing unit.

17. The computer-implemented method of claim 16, wherein the parallel processing system causes the single kernel to complete executing in the first mode prior to operating in the second mode.

18. A non-transitory computer-readable media storing computer instructions that, when executed by one or more processors, cause the one or more processors to perform the steps of:

assigning a first kernel and a second kernel for execution by a first processing unit of a plurality of processing units coupled to a memory, the first processing unit including a first scratchpad and a first register file, wherein the first processing unit is capable of executing the first kernel and the second kernel;

assigning a third kernel for execution by a second processing unit of the plurality of processing units, the second processing unit including a second scratchpad and a second register file, wherein the second processing unit is capable of executing the third kernel, wherein storing of first data to either the first scratchpad or the second scratchpad does not cause the first data to be stored in the memory;

configuring the first scratchpad to allow such first kernel to store second data to the first scratchpad, to allow such second kernel to load the second data from the first scratchpad, and to disallow such third kernel to store or load the second data from the first scratchpad, wherein the first scratchpad is allocated from a pool of scratchpad memory included within the first processing unit and the first scratchpad is deallocated after execution of such first and second kernels, thereby returning the first scratchpad to the pool of scratchpad memory; and configuring the second scratchpad to allow such third kernel to store third data to the second scratchpad and to disallow such first and second kernels to load the third data from the second scratchpad.

\* \* \* \* \*